(12) United States Patent
Braun et al.

(10) Patent No.: US 8,872,510 B2
(45) Date of Patent: Oct. 28, 2014

(54) DEVICE FOR DETECTING A ROTATIONAL ANGLE OF A ROTATABLE PART

(75) Inventors: Alexander Braun, Pforzheim (DE);
Matthias Waibler, Remshalden-Hebsack (DE); Thorsten Droigk, Marbach Am Neckar (DE); Hansjoerg Vollmer, Sandringham (AU)

(73) Assignee: Robert Bosch GmbH, Stuttgart (DE)

( * ) Notice: Subject to any disclaimer, the term of this patent is extended or adjusted under 35 U.S.C. 154(b) by 548 days.

(21) Appl. No.: 13/124,060

(22) PCT Filed: Oct. 12, 2009

(86) PCT No.: PCT/EP2009/063276
§ 371 (c)(1),
(2), (4) Date: Sep. 8, 2011

(87) PCT Pub. No.: WO2010/043587
PCT Pub. Date: Apr. 22, 2010

(65) Prior Publication Data
US 2011/0309826 A1    Dec. 22, 2011

(30) Foreign Application Priority Data
Oct. 13, 2008  (DE) .......................... 10 2008 042 791

(51) Int. Cl.
*G01B 7/30* (2006.01)
*G01D 5/14* (2006.01)

(52) U.S. Cl.
CPC ..................................... *G01D 5/145* (2013.01)
USPC .................................................... 324/207.25

(58) Field of Classification Search
USPC .................................................... 324/207.25
See application file for complete search history.

(56) References Cited

U.S. PATENT DOCUMENTS

| 5,880,586 A * | 3/1999 | Dukart et al. .............. 324/207.2 |
| 6,534,971 B1 * | 3/2003 | Braun et al. ................. 324/207.2 |
| 8,390,276 B2 * | 3/2013 | McDonald et al. ........ 324/207.25 |
| 2007/0029995 A1 * | 2/2007 | Ichiman ....................... 324/174 |

FOREIGN PATENT DOCUMENTS

| CN | 87 2 00861 | 11/1987 |
| CN | 1834589 | 9/2006 |
| DE | 29 30 649 | 2/1980 |
| DE | 195 43 562 | 5/1996 |
| DE | 102 41 214 | 3/2004 |
| DE | 603 15 388 | 5/2008 |
| FR | 2 906 363 | 3/2008 |
| WO | WO 97/18119 | 5/1997 |
| WO | WO 2007/107649 | 9/2007 |

OTHER PUBLICATIONS

International Search Report for PCT/EP2009/063276, dated May 6, 2010.

* cited by examiner

*Primary Examiner* — Reena Aurora
(74) *Attorney, Agent, or Firm* — Kenyon & Kenyon LLP

(57) ABSTRACT

An apparatus for sensing a rotation angle of a rotatable part, preferably a steering wheel or steering column of a vehicle includes at least one magnet, at least one sensor that senses the magnetic field of the magnet, at least one housing in which the sensor and/or magnet are disposed movably relative to one another, wherein a hub is provided which is connected to the magnet to yield an integrated component, and which is connectable to the rotatable part.

15 Claims, 7 Drawing Sheets

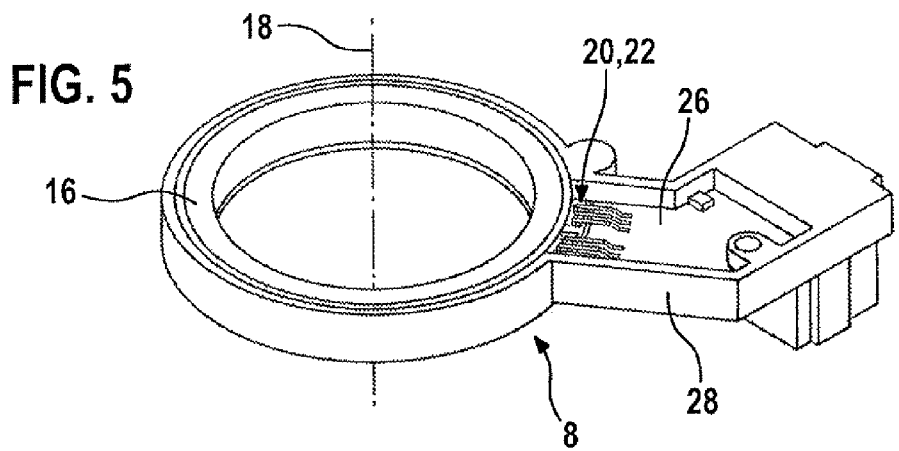
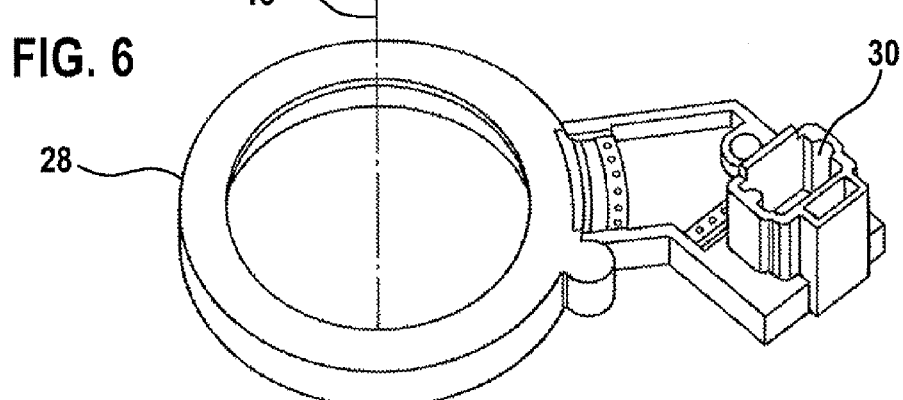
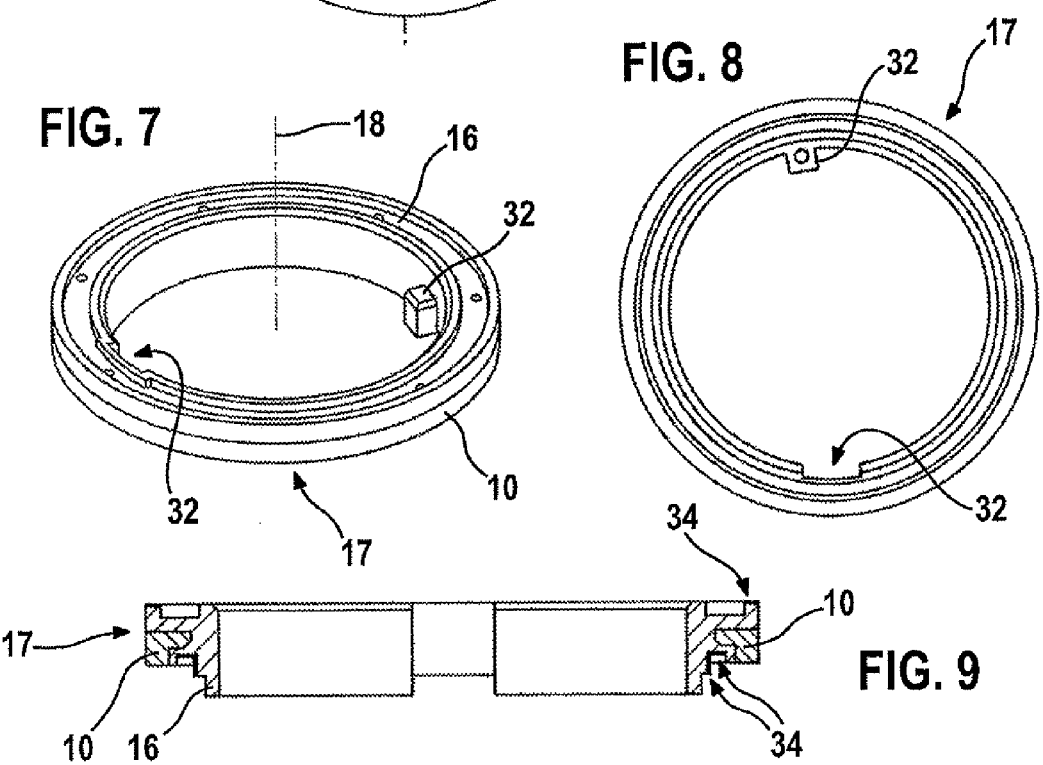

DEVICE FOR DETECTING A ROTATIONAL ANGLE OF A ROTATABLE PART

FIELD OF THE INVENTION

The present invention relates to an apparatus for sensing a rotation angle of a rotatable part.

BACKGROUND INFORMATION

DE 195 43 562 discloses an assemblage for non-contact rotation angle sensing of a rotatable element. In order to sense in simple fashion the absolute rotational position of the rotatable element, the sensor assemblage is constructed from at least two sensor elements, and is disposed with respect to the rotatable element in such a way that the field lines proceeding from the rotatable element extend, in any rotational position, transversely to the sensor structures predefined by the direction of a current in the sensor elements. Using various electronic evaluation devices, the directional components of the field lines can be evaluated, in order to ascertain the rotational position, by evaluating the phase position between the input and output signals of the respective sensor elements. The input signals delivered are either sinusoidal or square-wave alternating voltages, or DC voltages.

SUMMARY

Example embodiments of the present invention simplify the apparatus for sensing a rotation angle.

The apparatus according to example embodiments of the present invention for sensing a rotation angle of a rotatable part has the advantage that because of the relative sensing of the rotation angle, no internal evaluation units (such as e.g. microcontrollers, etc.) for calculating an absolute steering angle need to be physically integrated directly into the sensor. A reduction in installation space can thus also be achieved. Corresponding subsequent steps, such as calibration of the sensor during production at the factor, are superfluous. This yields lower costs for manufacturing and assembly. The apparatus according to example embodiments of the present invention operates very robustly as compared with sensors having optical measurement elements, since it now no longer loses its accuracy or functionality relatively quickly as a result of contamination that may penetrate. Particularly usefully, the integrated component made up of the hub and magnet is formed by injection-embedding the magnet in plastic. Further and more complex geometries can thus also be achieved in the component in simple fashion.

Particularly significantly, the magnet has a substantially L-shaped cross section, so that the hub can be integrated with the magnet in very strong fashion to yield an integrated component.

In example embodiments, the hub has at least one entraining element to transfer a rotary motion of the rotatable part, preferably a steering column. What is provided as an entraining element is a component extending in a radial direction toward the rotation axis of the rotatable part, or a recess. Depending on the disposition of the housing, the integrated component could be installed from above or from below with no need to adapt the housing to different installation spaces. The flexibility of the assemblage is thereby enhanced, using the same components.

In example embodiments, the hub has at least one bearing surface, preferably oriented transversely to the rotation axis, for rotatable journaling of the hub in the housing. The hub is preferably made, at least at one bearing surface, of a low-wear material. The result is that the bearing surfaces can be selected, regardless of the geometry of the magnet, so that an optimized solution results in terms of interaction with the housing (fits, tolerances, ease of assembly, etc.). Further and more complex structures can moreover be implemented on the hub. The hub may be made of the same material as the magnet, preferably of plastic or a completely magnetizable material. Manufacture of the components can thereby be further simplified.

In example embodiments, the hub and/or the magnet interacts with an immobilizing element for immobilization with respect to the housing. Particularly significantly, the immobilizing element provides a motion of the magnet or the hub in a rotational direction, but suppresses a motion parallel to the rotation axis in the assembled state. The immobilizing element is arranged movably or resiliently, preferably as a latching hook, and/or is connected to the housing or to the hub.

A latching hook that immobilizes the hub in both an axial and a radial direction is particularly suitable as an immobilizing element. The latching hooks are, however, force-neutral and stress-free after the assembly operation, so they do not restrict the movability of the hub or magnet with respect to the housing. The number of latching hooks may be selected so that the hub is still reliably immobilized even in the event of failure of a hook, for example upon breakage. For example, five latching hooks distributed uniformly in the circumferential direction of the hub are provided in order to achieve this functionality. The functional reliability of the apparatus can thereby be further enhanced. A cover for axial immobilization of the hub is also superfluous thanks for the latching hooks, so that components can be eliminated.

In example embodiments, a further sensor is provided for sensing the magnetic field of the magnet, which sensor is disposed at a distance relative to the first sensor so as to result in an output signal phase-shifted with respect to the output signal of the other signal. It is now thereby possible to sense not only the relative change in position but also the rotation direction. By disposing further sensors around the magnet it is also possible to increase the resolution with no need to make extensive modifications to the measurement principle or design. All that is necessary for this is to provide, preferably on the circuit board, a logic device that, by logical operations (AND or OR gate), combines the two output signals into one output signal of higher resolution. The outlay for this is relatively small. On the other hand, only one output signal needs to be forwarded to the evaluation unit, thereby reducing wiring complexity.

In example embodiments, provision is made that an apparatus for shifting the signal level of at least one output signal of a sensor is provided, preferably on the circuit board. Particularly significantly, the signal levels of the sensors are selected so that in normal circumstances they deviate from the voltage levels of the supply voltage and of ground. It is thereby particularly easy to deduce a fault in the sensor simply on the basis of the signal level. It is particularly worthwhile to provide for this purpose, in the evaluation unit, a fault detection unit that detects, on the basis of the signal level of at least one of the output signals, whether a fault exists in one of the sensors.

In example embodiments, provision is made that at least one connector element of the sensor has at least one flexural region. This serves in particular to compensate for stresses, for example due to thermal loads. The mechanical stability of the assemblage can thereby be further enhanced. In example embodiments, a connector element of the sensor has at least one further flexural region. As a result, the connector element can be directed onto the circuit board in a manner suitable for electrical contacting, for example by soldering. It is possible as a result to produce the apparatus in simpler fashion while enhancing mechanical strength.

In example embodiments, at least one holding element is provided to absorb mechanical stresses that act on the sensor. The holding element is arranged in ribbed fashion on the housing or on a part connected to the housing. This holding element absorbs mechanical forces acting on the sensor, so that the robustness of the apparatus can be further enhanced. Immobilization of the sensor or its connector elements on the housing can furthermore be accomplished by surface melting of the holding ribs, for example by hot upsetting or laser application, which further increases strength.

In example embodiments, at least one pocket or recess is provided in the housing for reception of the sensor. This allows accurate positioning of the sensor to be achieved, in particular if further sensors also need to be disposed with high accuracy relative to one another in order to achieve a defined phase shift of their output signals. The sensor is preferably disposed so that it senses a magnetic field of the magnet that extends substantially parallel to the rotation axis of the rotatable part. The overall height of the apparatus can thereby be minimized. In example embodiments, at least one fastening device is provided in the housing for connecting the circuit board to the housing. The housing can thereby be accurately positioned. In order to fasten the housing to the circuit board, the fastening device is preferably arranged in thermally deformable fashion, for example by hot upsetting. The fastening operation could thus be accomplished, together with the holding ribs, in only one working step. In example embodiments, at least one rivet connection is provided as a fastening device. This serves in particular to absorb forces acting on the circuit board that are introduced, for example, via the plug connector. The stability and robustness of the assemblage are thereby even further enhanced.

An apparatus according to example embodiments of the present invention for sensing a rotation angle is depicted in the drawings and will be further explained below.

DETAILED DESCRIPTION

Figure 1:
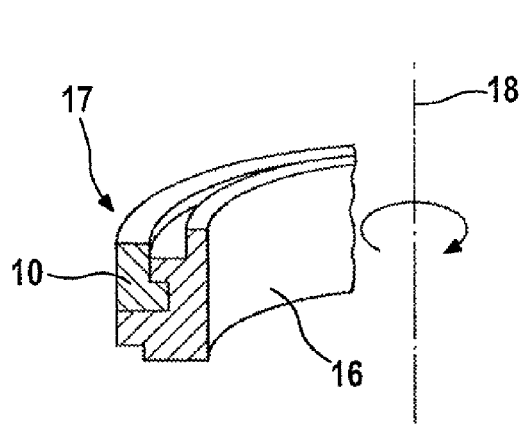
FIG. 1 is a perspective view of a hub having an integrated magnet (without bearing geometry, FIG. 2 is a plan view of a multi-pole magnet, FIG. 3 is a perspective view of the assemblage of hub, magnet, and sensors, FIG. 4 shows the time-dependent output signals of the two sensors, FIG. 5 is a perspective view from above of the apparatus for sensing a rotation angle, FIG. 6 shows the assemblage of FIG. 5 from below, FIG. 7 is a perspective side view of the hub with integrated entraining elements, FIG. 8 is a plan view of the hub of FIG. 7, FIG. 9 is a sectional view of the assemblages according to FIGS. 7 and 8, FIG. 10 is a perspective view of the apparatus for sensing a rotation angle, with the hub inserted, FIG. 11 shows the apparatus according to FIG. 10, having a hub inserted from an opposite direction, FIG. 12 is a perspective half-section of the connection of the hub to the housing by way of immobilization elements, FIGS. 13 to 18 show sensor elements each having differently shaped connector elements, FIG. 19 is a perspective view for contacting of the connector elements of the sensor with the circuit board, FIG. 20 is a perspective view for immobilization of the sensor using fastening ribs, prior to surface melting, FIG. 21 is a perspective view of the housing with circuit board, FIG. 22 is a perspective overall view of the apparatus for sensing a rotation angle, FIG. 23 shows output signals of the first and second sensor, as well as the output signal resulting after a possible logical combination, and FIG. 24 is a block diagram of the assemblage for signal processing.
Figure 2:
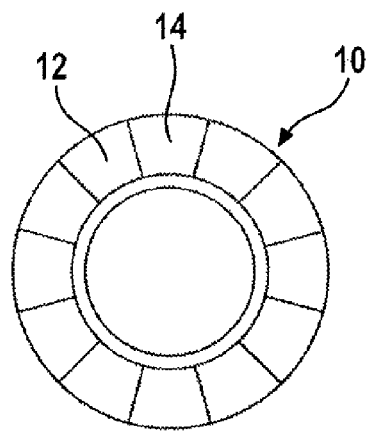
Figure 3:
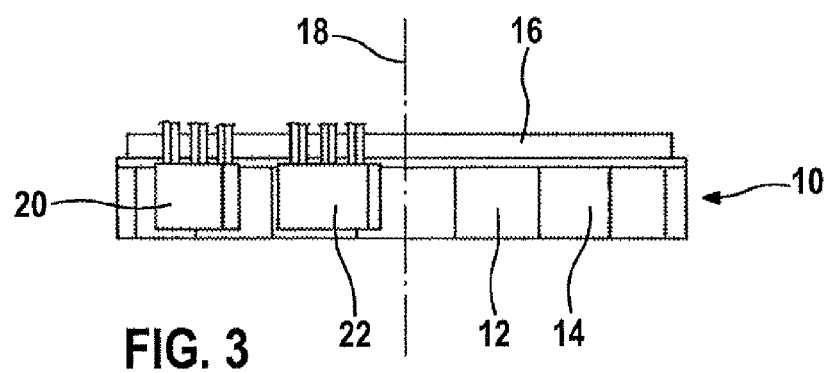
Figure 4:
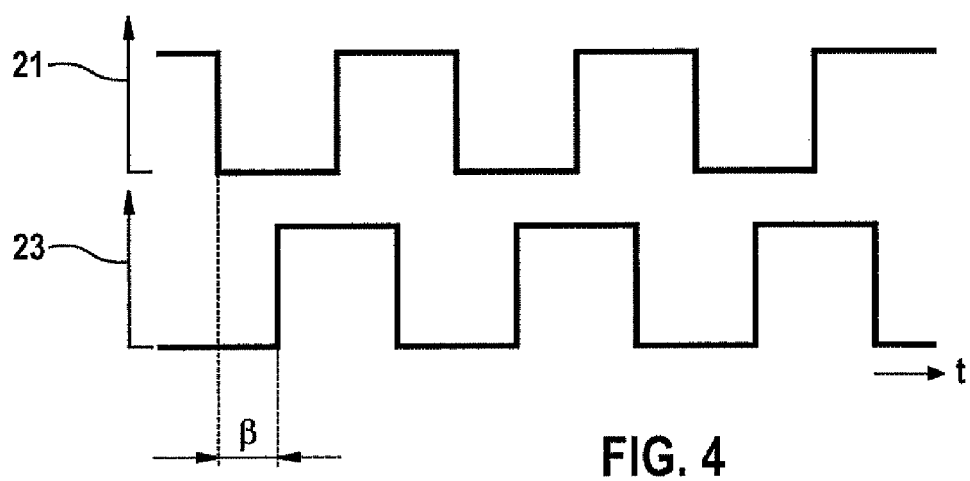

A magnet 10 is disposed on an annular or hollow-cylindrical hub 16 in the upper outer circumferential region, thus forming an integrated component 17. Magnet 10 is arranged here as a multi-pole magnet, as may be gathered from FIG. 2 which is a plan view of magnet 10. For better connection of magnet 10 to hub 16, there is provided at the lower end of magnet 10 a projection that extends in this region somewhat farther toward rotation axis 18 of hub 16 than in its upper region. Hub 16 and magnet 10 are in engagement, for example, with a steering column or with another part connected to the steering wheel. The part that rotates in the context of steering motion, for example the steering column, is connected via an entraining element 32 to hub 16 disposed in apparatus 8 for rotation angle sensing. The rotary motion of the part is thereby transferred directly to hub 16. Hub 16 contains magnet 10, which is arranged as a multi-pole magnet. The latter carries north poles 12 and south poles 14 distributed alternatingly over the circumference. Upon rotation of the steering column, multi-pole magnet 10 thus co-rotates at the same angular velocity. The possibility thus exists of disposing a sensor 20 at a specific point in the measurable region of the magnetic field, which sensor furnishes measured values that are dependent on the magnetic field direction at that point or allow it to be deduced. A Hall sensor, which outputs a binary signal as a function of whether the majority of its sensitive region is located in the influence region of a north pole 12 or of a south pole 14, could be used for this as sensor 20. The sensor 20 and magnet 10 should be disposed movably relative to one another. The sensor could likewise be arranged as a reed contact that changes its output signal as a function of the magnetic field.

With the use of only one sensor 20 it would be possible to ascertain the relative rotation angle of the steering column, but not the direction of rotation. A further sensor 22 is therefore provided which is placed at a defined distance from first sensor 20 so as to result in a specific offset 13 between the two output signals 21, 23 of the two sensors 20, 22. Based on the time sequence of signal edges 21, 23, conclusions can be drawn as to whether the steering wheel or steering column is rotating clockwise or counterclockwise. Sensors 20, 22 have been disposed to lie farther radially outward relative to magnet 10 so that they sense its magnetic field in a radial orientation.

Electronic components are necessary in order to supply sensors 20, 22 with the required operating voltage and to make their output signals 21, 23 available to the interrogating systems, for example a control unit 58 of an electronic stability program. These components are mounted and electrically connected on a circuit board 26. Further functions (e.g. for modifying the voltage levels) can be implemented thereon if necessary.

Hub 16, magnet 10, sensors 20, 22, and circuit board 26 are accommodated in a housing 28 that, via an integrated plug connector 30, provides connection to the voltage and communication network of the motor vehicle. Housing 28 also handles further functions such as, for example, journaling hub 16 with magnet 10, axial immobilization by immobilizing elements 36, or further fastening functions of sensors 20, 22 via holding elements 50 (to be explained later).

It would also be possible in principle to measure the field of magnet 10 in an axial direction with reference to rotation axis 18. Sensors 20, 22 would then need to be disposed not alongside but instead above or below magnet 10 in order to sense the magnetic field of the sensor in an axial direction.

The integration of magnet 10 into hub 16 is an aspect of apparatus 8 for sensing a rotation angle. This integration can be achieved, for example, by injection-embedding magnet 10 in plastic. By appropriate selection of the material, the resulting combined component made up of magnet 10 and hub 16 can be configured so that wear-free or low-wear journaling of hub 16 in housing 28 is achieved. Suitable material selection for hub 16 also depends on the material of housing 28; suitable materials might be, for example, PA-12 (polyamide) and PBT (polybutylene terephthalate).

As is evident in FIG. 9, bearing surfaces 34 that interact with corresponding bearing countersurfaces of housing 28 are selected, regardless of the geometry of magnet 10, so that an optimized solution can be found in terms of interaction with housing 28 (fits, tolerances, ease of assembly). The bearing for housing 28 is formed by two bearing surfaces 34 that are mutually perpendicular in section, with the result that hub 16 is aligned in an axial and radial direction with reference to rotation axis 18. A third bearing surface 34 on the upper edge of the outer periphery of hub 16 interacts with immobilizing element 36 (presented later on). Provision is furthermore made that at least one entraining element 32 is integrated into hub 16. Two types of entraining element 32 are shown for example in FIGS. 7 and 8. On the one hand, a recess oriented outward in a radial direction is provided on the inner side of hub 16, in which recess a complementary extension of a rotatable part, for example the steering column, can engage. Also provided is a further entraining element 32 which has a protrusion that is oriented from the inner side of hub 16 toward rotation axis 18, and interacts with a corresponding recess in the rotatable part.

The combined module made up of hub 16 and magnet 10 is particularly advantageous because more-complex geometries, for example elastically resilient latching hooks, can also be implemented on hub 16. A connection to housing 28 can be achieved by such latching hooks. Alternatively, it would also, be possible to use for hub 16 the same material as for multi-pole magnet 10, thereby simplifying production of the component. For example, it could then be generated as one component with the aid of an injection-molding method. A further alternative is to arrange hub 16 as a component having symmetrical bearing points, in which context the integrated magnet 10 would be disposed centeredly.

Figure 10:
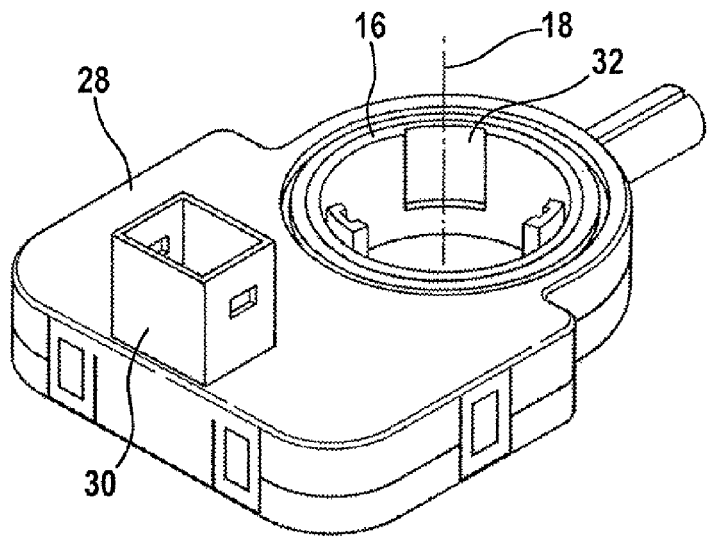
Figure 11:
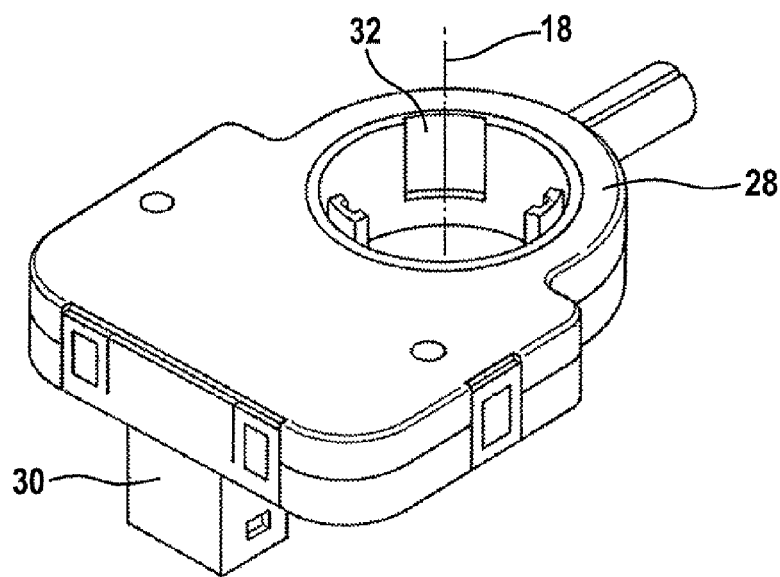

Entraining elements 32 that are mounted on one side of hub 16 are always necessary for the attachment of apparatus 8 for sensing a rotation angle to the movable part, for example the steering column. For reasons of installation space, it is necessary to install housing 28 in rotated fashion, for example because plug connector 30 is oriented in the opposite direction; all that is required for this is to install hub 16 of apparatus 8 also in rotated fashion. Two variants of the same apparatus are thus available, with no modification to hub 16 or magnet 10. These possibilities are shown in FIGS. 10 and 11, where in both instances hub 16 is oriented in the same fashion regardless of the position of plug connector 30.

A further aspect of apparatus 8 is the fastening of hub 16 to housing 28, which is accomplished with the aid of immobilizing elements 36. This is because hub 16, with magnet 10, must be immobilized in an axial direction so that it does not move in an axial direction out of housing 28. Immobilizing elements 36, which are preferably arranged as latching hooks or clips, are provided for this purpose. What is important about these immobilizing elements 26 is that on the one hand they permit a motion of hub 16 about rotation axis 18, but suppress shifting in an axial direction, with a defined clearance. Immobilizing, elements 36 surround hub 16 in circular fashion. Upon placement of hub 16 into housing 28, it is first necessary to overcome counter-forces that occur as immobilizing elements 36 are bent aside. Once hub 16 has reached its final position, immobilizing elements 36 spring back over it, with the result that immobilizing elements 36 are entirely force-neutral and stress-free. Hub 16 can thus rotate without causing undesired friction at immobilizing elements 36. Immobilizing elements 36 are selected, in terms of their number and placement, so that hub 16 is secured over more than half its circumference even in the event of failure of one immobilizing element 36, with the result that axial immobilization is maintained. This solution furthermore makes superfluous a cover that otherwise would need to have secured hub 16, as well as fastening devices (for example, screws or rivets) required for it.

Figure 12:
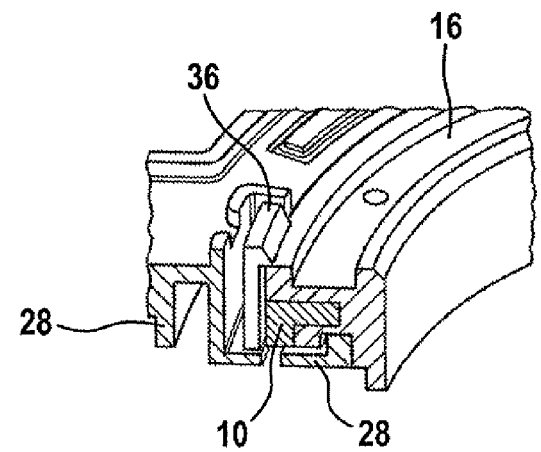

An example of a geometrical disposition of an immobilizing element 36 with respect to hub 16 is shown in FIG. 12. Immobilizing element 36 is connected directly or indirectly to housing 28. For assembly, hub 16 is introduced from above into housing 28, and slides the tip of latching hook 36 outward over the bevel. In the final position, hub 16 then sits on the counter-surface of housing 28. Latching hook 36 then springs back and counteracts any axial displacement of hub 16. Immobilizing element 36 is disposed with a radial spacing from the outer side of hub 16 and magnet 10. The underside of latching hook 36 interacts with the externally located upper side of hub 16, which was labeled in FIG. 9 at the top right as bearing surface 34.

Instead of latching hooks as possible immobilizing elements 36 with their defined geometry, resiliently mounted immobilizing elements 36 could also be used. The functions of "resilience" and "securing" can also be distributed among more than one element.

Alternatively, immobilizing elements 36 could be mounted neither on hub 16 nor on housing 28, but on an additional component that is used for mutual connection of hub 16 and housing 28. Immobilizing elements 36 could furthermore also be disposed on the outer side of hub 16, and could engage resiliently into corresponding recesses in housing 28.

Figure 18:
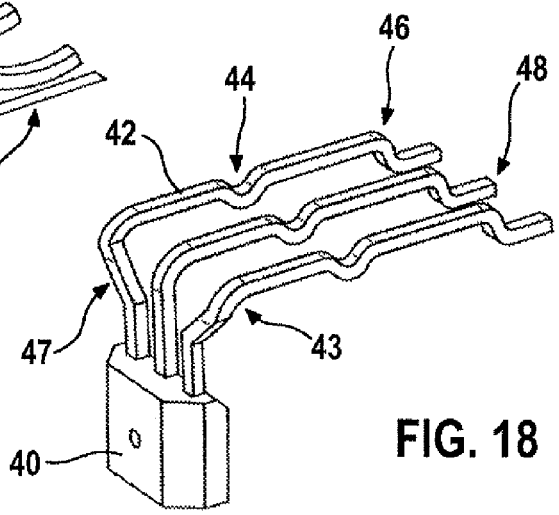
Figure 19:
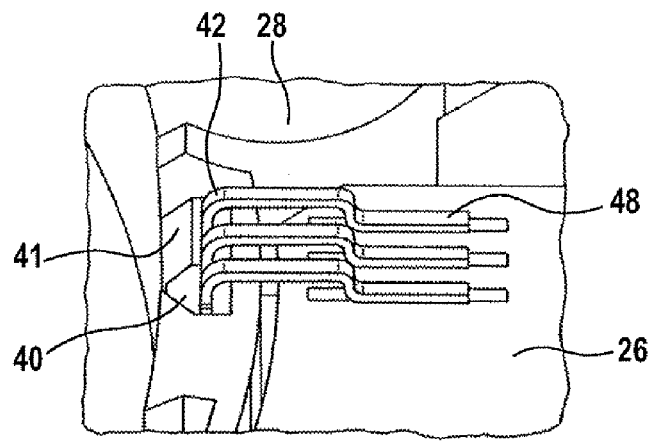

Sensors 20, 22 are made up of a housing 40 and multiple connector elements 42 through which the signals of the electronic components disposed in the interior of housing 40 are conveyed out. Sensors 20, 22 must be disposed in housing 28 in a fixedly defined position relative to one another and to magnet 10. Provided for this purpose in housing 28 are pockets 41 that are coordinated with the outer contour of housing 40 and permit locationally defined positioning. Such pockets 41 are shown in FIGS. 18 and 19. Connector elements 42 of sensors 20, 22 are bent approximately 90 degrees (reference character 43) in order to electrically contact the radially oriented sensor 20, 22 with circuit board 26. Sensors 20, 22 are preferably arranged as so-called through hole technology (THT) components, and are used similarly to a surface-mounted technology (SMT) component. It is possible as a result to measure the magnetic field of magnet 10 perpendicular to the orientation of the populatable surfaces of circuit board 26.

Further bend regions 44, 46 of connector elements 42 are additionally provided.

Figure 13:
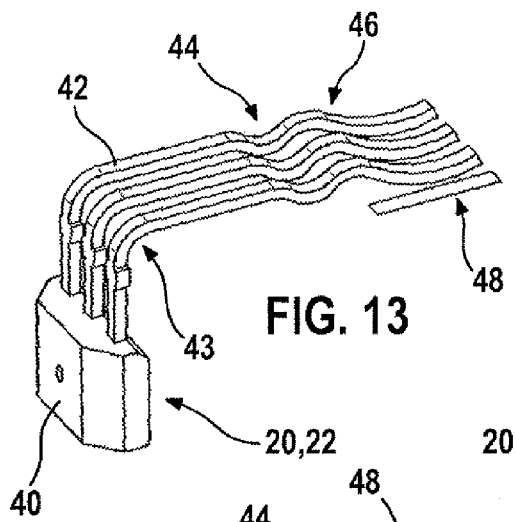

A first bend region 44, as shown in FIG. 13, serves to compensate, after the immobilization of housing 40 and soldering of connector elements 42 onto circuit board 26, for stresses that can arise during operation, for example due to alternating thermal loads. This is followed by a second bend region 46 by way of which connector elements 42 are conveyed to circuit board 26 such that it can be wetted as effectively as possible with solder and thereby connected electrically and mechanically to circuit board 26 in a contacting region 48. What results in the exemplifying embodiment according to FIG. 13 is thus a substantially S-shaped profile for connector elements 42.

Figure 14:
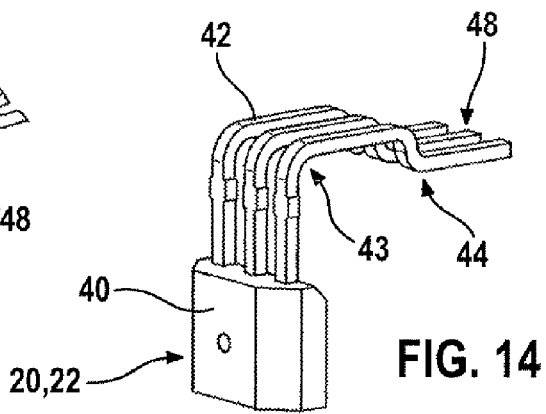
Figure 15:
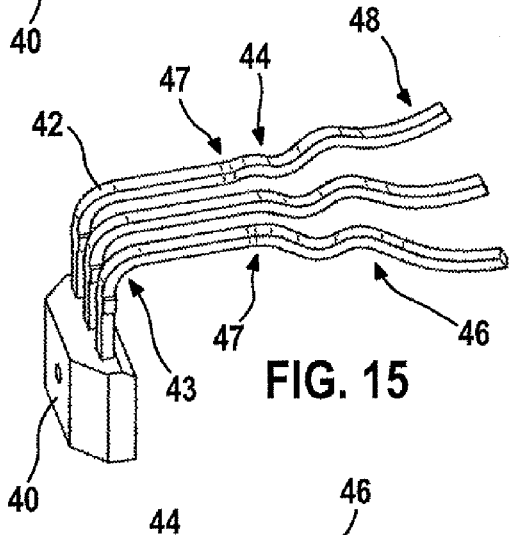

The exemplifying embodiment according to FIG. 14 encompasses only a first bend region 44 in order to guide connector elements 42 into the contacting regions substantially parallel to the surface of circuit board 26.

Figure 16:
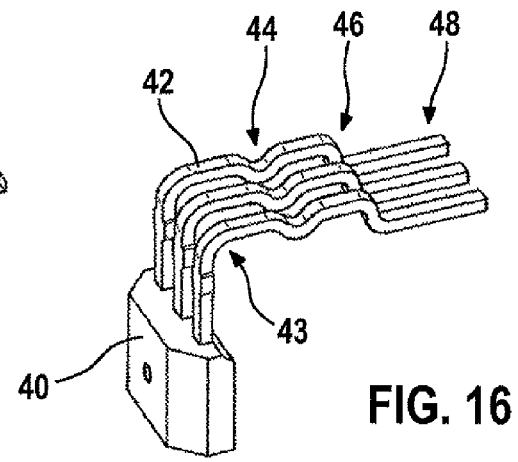
Figure 17:
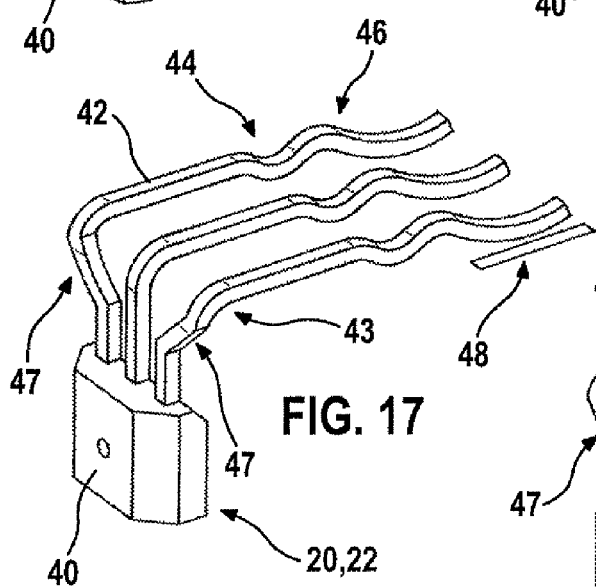

Alternatives would be possible. For example, the 90-degree bend 43 in the vicinity of housing 40 could be omitted if the magnetic field now needed to be sensed not in a radial direction as described, but instead axially. In addition, the 90-degree bend 43 could also be replaced by a different angle. Alternatively, first bend region 44 could be omitted if such omission is necessary for relevant reasons, for example cost, feasibility, etc., as depicted in FIG. 14. Alternatively, second bend region 46 could also be omitted and contacting to circuit board 26 could be implement in a manner other than soldering, for example by a mechanical latching plug connector that is already mounted on circuit board 26 and into which connector elements 42 are inserted. Corresponding configurations are depicted in FIGS. 14 and 16. Second bend region 46 could likewise be omitted if such omission is necessary, because of the soldering method selected or for other reasons, in order to carry connector elements 42 on to the end in a straight line (FIGS. 14, 16). If applicable, a third bend region 47 could be provided for the two outer connector elements 42 in order to increase the distance of connector elements 42 from one another, if this is necessary because of the soldering method selected or for other reasons. In a further variant in accordance with FIG. 18, the two outer connector elements 42 are bent outward in a third bend region 47, then proceed after a 90-degree kink 43 substantially parallel to the surface of circuit board 26, experience a V- or U-shaped kink as a result of first bend region 44, then once again proceed parallel to the surface of the circuit board until the step-shaped second bend region 46 once again aligns contacting regions 48 parallel to circuit board 26 in its immediate vicinity for suitable contacting. In principle, other sensor elements 20, 22 could also be bent in this fashion if they are to be used in the sensor, for example reed contacts or sensors.

Figure 20:
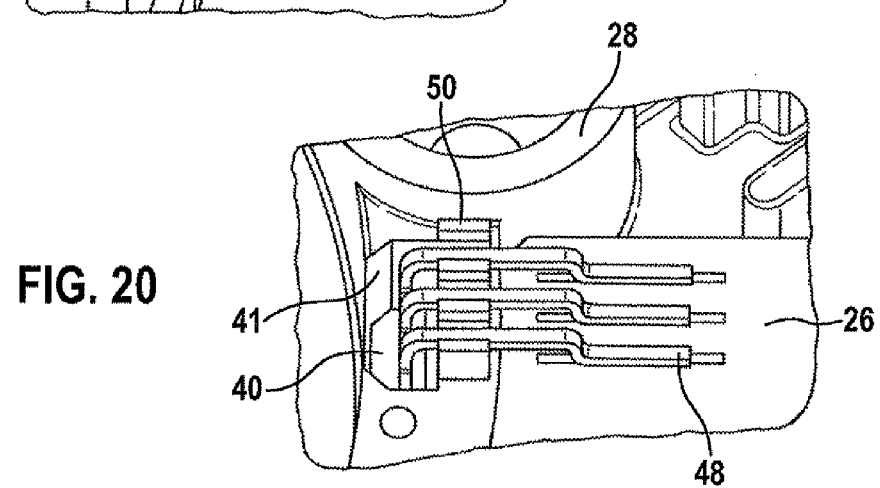

Sensor 20, 22 according to FIG. 14 is disposed in pocket 41 in housing 28 and connected in electrically conductive fashion to circuit board 26 by contact regions 48 (FIGS. 19, 20). For additional improved fastening of sensor elements 20, 22 to housing 28, preferably rib-shaped holding elements 50, which are coordinated with the external geometries of connector elements 42, are provided on housing 28. This is because, during utilization of apparatus 8 for sensing a rotation angle, forces occur which can act on connector elements 42 of sensor 20, 22. In this context, either the solder connection would need to absorb these forces, which might have a negative effect on its service life if the forces are not absorbed at another location; or alternatively, housing 40 of sensor 20, 22 could also be stressed such that connector elements 42 in or on housing 28 might sustain damage, for example be torn off. So-called upsetting ribs 50 are therefore provided on housing 48 along connector elements 42 as holding elements. Upon placement of sensor 20, 22 into pocket 41 in housing 28, connector elements 42 are firstly passed between ribs 50, the result being that they experience guidance and that better coordination between connector elements 42 and the circuit board contacting regions is thereby provided. Upon hot upsetting, the plastic at ribs 50 is then locally surface-melted, and the result of a force action, for example using a punch, is that connector elements 42 are immobilized by the solidifying plastic. The material can thus absorb the aforementioned forces, so that the solder connection or housing 40 of sensor 20, 22 is stressed only slightly or not at all. The corresponding ribs 50 are shown in FIG. 20 before surface melting. Alternatively, provision could be made that the material of ribs 50 is surface-melted not by hot upsetting but with the aid of a different method, for example by laser action. A possibility in a further alternative example embodiment is for there to be no surface-melting of material, but instead for the feet to be immobilized on housing 28 in a different fashion, for example using adhesives or other mechanical components. Alternatively, the immobilizing function could be implemented by an additional component that is mounted on housing 28.

Figure 21:
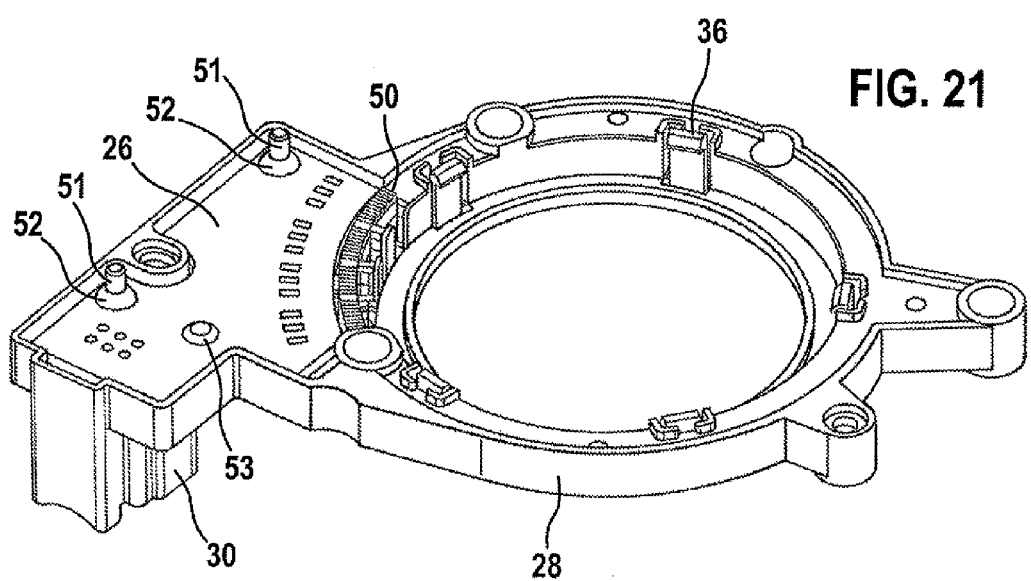

The perspective view in FIG. 21 depicts housing 28 with circuit board 26 but without integrated part 17. Circuit board 26 is fastenable to housing 28 via two pegs 51. These pegs are constituents of housing 28 and thus made of the same material. For fastening, circuit board 26 is pressed over these pegs 51 into housing 28. Circuit board 26 is thereby correctly positioned. The height of pins 51 is preferably configured so that sufficient material is available so that this additional material can be used, by hot upsetting, to fasten circuit board 26. The corresponding convexly depicted shape of the pegs after deformation, preferably hot upsetting, is labeled in each case with the reference number 52. Also provided is a rivet connection 53 that absorbs forces occurring in particular at plug connector 30, as well as forces transferred to circuit board 26. Rivet 53 is preferably made of metal. Also easily visible in this view is the annular bearing surface of housing 28 for journaling hub 16 at its lower bearing surfaces 34.

Figure 22:
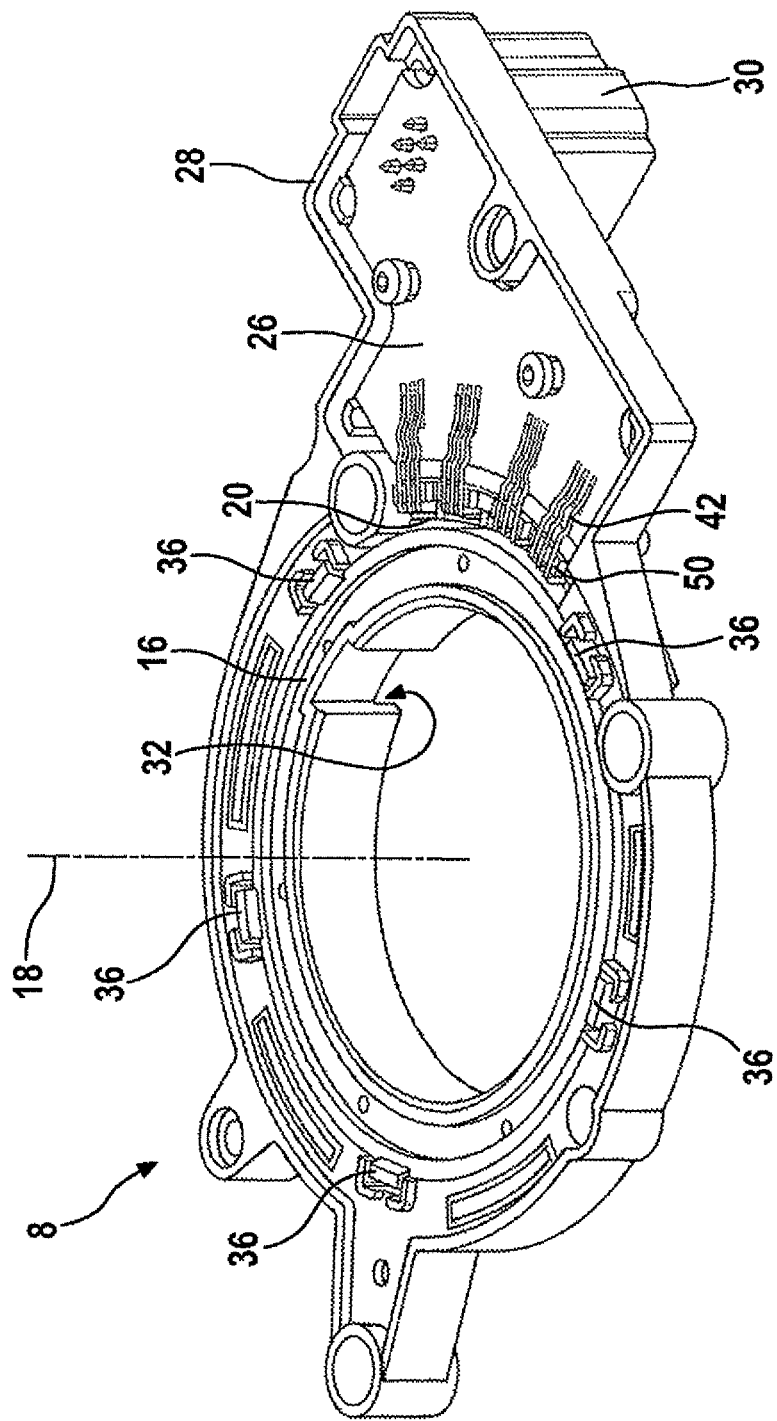

The perspective view according to FIG. 22 shows all the previously described components once again, in correlated fashion. Hub 16 having integrated magnet 10, which is not visible in this view, is rotatably journaled in housing 28 via immobilizing elements 36 and corresponding bearing surfaces 34. An offset of hub 16 in an axial direction is not possible because the lower side of latching hooks 36, together with the upper side of hub 16, counteracts axial offset. Recess 32 on the inner side of hub 16, which interacts, as entraining element 32, with a steering column (not shown), is visible. Disposed in distributed fashion in a circumferential direction are, for example, four sensors 20, 22 which sense the magnetic field of magnet 10 in a radial direction and convey corresponding output signals via connector elements 42 optionally to further components (not specified in further detail) of circuit board 26. The resolution of apparatus 8 could be even further increased by further sensors with suitable positioning. On the other hand, a third and fourth sensor could be used in order to make their two output signals available to a different system, for example one pair having adapted voltage levels and the other pair without adaptation.

For better connection of sensor elements 20, 22 to circuit board 26, on the one hand the corresponding bend regions 44, 46, 47 are provided in order to compensate in particular for thermal stresses. Also provided are holding elements 50 which absorb mechanical forces that act on sensor elements 20, 22 or their connector elements 42. As described, these could be arranged as ribs 50.

A relative measurement of the motion of a steering column, instead of an otherwise usual absolute measurement, is provided as a further central idea of apparatus 8 for sensing a rotation angle of a rotatable part. Only a single sensor is necessary for this. Because two sensors 20, 22 are provided, in addition to the relative rotation angle of the steering column, the direction of that rotation can also be sensed. Pulse-shaped output signals are generated upon a rotation of the steering wheel, as evident in the signal profiles according to FIG. 23. The two output signals 21, 23 can be combined into a single pulsing output signal 54 by corresponding AND or OR gates as shown in logic element 56. A rotation of the steering wheel causes generation of the corresponding signal sequences that can be associated, on the basis of defined properties, with a rotation angle. The number of pulses is thus directly proportional to the angle through which the steering wheel is moving. The absolute angle can be ascertained with sufficient accuracy with the aid of a downstream evaluation unit 60 separate from apparatus 8 for sensing a rotation angle, and communicated to the interrogating systems, for example a control unit 58. Also required is an algorithm with which the zero position of the steering wheel must be ascertained in order to provide initialization of the relative sensing operation. This algorithm is likewise executed in evaluation unit 60. This algorithm is common knowledge in the art and will not be further discussed hereinafter. In the context of the present apparatus 8, it is therefore only the output signals of sensors 20, 22, which are provided as binary signals depending on the type of magnetic field, or the signal combined therefrom, that is transferred to control unit 58. Only there is the absolute position of the steering wheel then ascertained, in a microcontroller 60 as an example of an evaluation unit.

Figure 24:
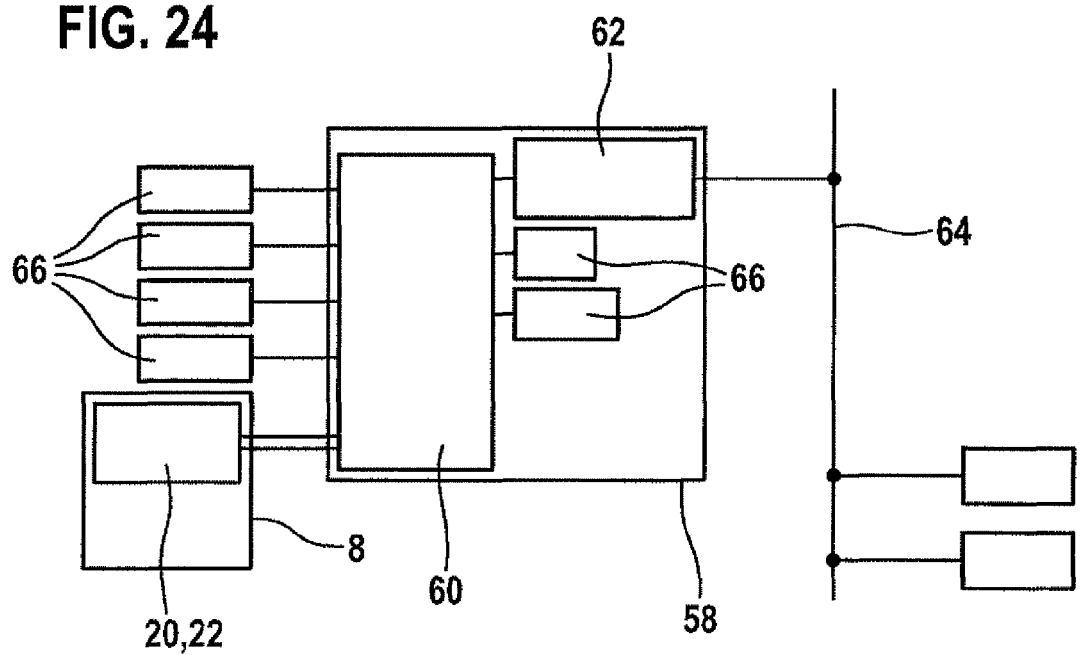

Control unit 58 or microcontroller 60 furthermore has a corresponding interface to apparatus 8. If applicable, the absolute steering angle information ascertained in microcontroller 60 can be forwarded via a bus system 64 to further control units (not designated in further detail). Further sensors 66, whose values microcontroller 60 likewise requires in order, for example, to calculate corresponding control variables for an electronic stability program in a motor vehicle, can also be integrated into control unit 58. Wheel rotation speed signals from further wheel rotation speed sensors 66 are also delivered to control unit 58, as likewise shown by way of example in FIG. 24.

Apparatus 8 for sensing a rotation angle represents a safety-relevant component in the vehicle, and the outputted signals 21, 23 therefore need to be checked for correctness. Electronic components that shift the binary output signals of sensors 20, 22 to offset levels are provided for this purpose on circuit board 26. Instead of, for example, 5 V and 0 V (as the usual pullup voltage and ground potential, respectively), the signals are converted to 4.5 V and 0.5 V. If a short circuit to the supply voltage or to ground is then present in sensor 20, 22, those magnitudes (i.e. in the aforesaid fault instance 5 V or 0 V, respectively) are also outputted by sensor 20, 22. The downstream system, for example microcontroller 60, can immediately recognize that a fault exists in apparatus 8, since the signal levels differ from the expected signal levels. For this purpose, microcontroller 60 compares the output signals (modified by the aforementioned electronic components) of sensors 21, 23, and optionally the combined output signal 54, with corresponding limit values, and detects a fault in sensor 20, 22 if they are too high or too low. The same could also be achieved using a current signal.

Figure 23:
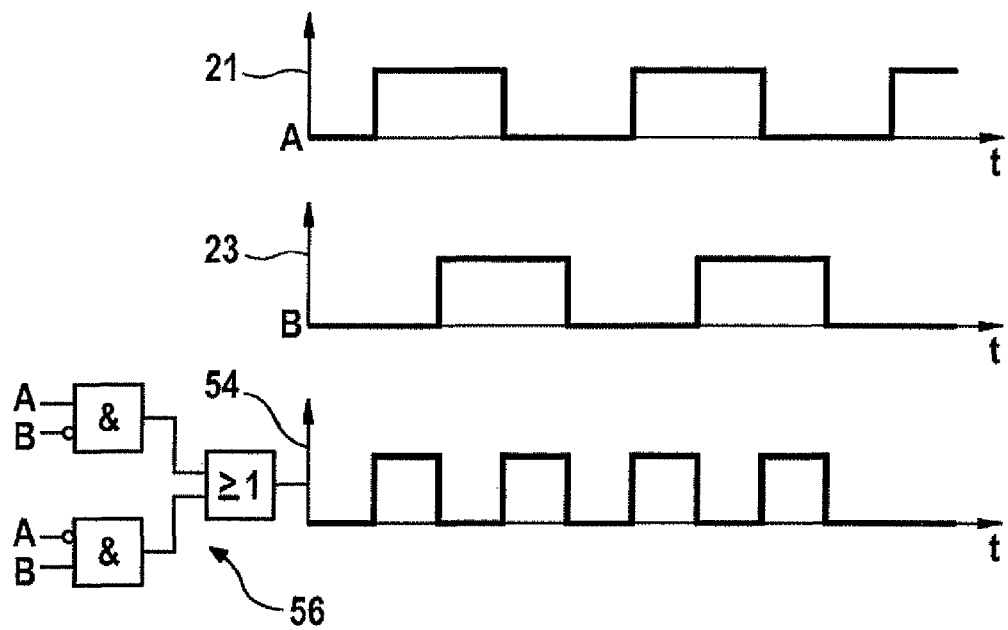

Logic element 56, already explained in FIG. 23, is additionally to be provided on circuit board 26 in order to achieve higher resolution. This generates a new output signal 54 that enables a higher resolution of the rotary motion of the steering wheel.

The aforesaid apparatus for sensing a rotation angle can be used for numerous application instances. It is particularly suitable for sensing a steering angle. The steering angle is already required in a number of vehicle functions, for example an electronic stability program, adaptive speed control, parking assistant, driver performance monitoring system, active front steering, four-wheel steering, adaptive illumination controller, or electrohydraulic steering. Its use is not, however, limited thereto.

What is claimed is:

1. An apparatus for sensing a rotation angle of a rotatable part, comprising:
    at least one magnet;
    at least one sensor adapted to sense a magnetic field of the at least one magnet;
    at least one housing, at least one of (a) the sensor and (b) the at least one magnet arranged in the housing and disposed movably relative to one another; and
    a hub connected to the at least one magnet to provide an integrated component and connectable to the rotatable part;
    wherein the integrated component made up of the hub and the magnet includes the magnet injection-embedded in plastic, and wherein the magnet has a substantially L-shaped cross section.

2. The apparatus according to claim 1, wherein the rotatable part includes at least one of (a) a steering wheel and (b) a steering column of a vehicle.

3. The apparatus according to claim 1, wherein the magnet includes an annular magnet having multiple north and south magnetic poles.

4. The apparatus according to claim 1, wherein the hub includes at least one entraining element adapted to transferring a rotary motion of the rotatable part.

5. The apparatus according to claim 4, wherein the rotatable part includes a steering column.

6. The apparatus according to claim 4, wherein the entraining element includes at least one of (a) a component and (b) a recess extending in a radial direction toward a rotation axis of the rotatable part.

7. The apparatus according to claim 1, wherein the hub includes at least one bearing surface adapted for rotatably journaling the hub in the housing.

8. The apparatus according to claim 7, wherein the bearing surface is oriented transversely to a rotation axis.

9. The apparatus according to claim 1, wherein the hub is formed, at least at one bearing surface, of a low-wear material.

10. The apparatus according to claim 1, wherein the hub is formed of a same material as the magnet.

11. The apparatus according to claim 10, wherein the hub and the magnet are formed of at least one of (a) plastic and (b) a completely magnetizable material.

12. The apparatus according to claim 1, wherein at least one of (a) the hub and (b) the magnet is adapted to interact with an immobilizing element for immobilization with respect to the housing.

13. The apparatus according to claim 12, wherein the immobilizing element provides for motion of at least one of (a) the magnet and (b) the hub in a rotational direction, but suppresses a motion parallel to a rotation axis in an assembled state.

14. The apparatus according to claim 12, wherein the immobilizing element is arranged at least one of (a) movably, (b) resiliently, and (c) as a latching hook.

15. The apparatus according to claim 12, wherein the immobilizing element is connected to at least one of (a) the housing and (b) the hub.

\* \* \* \* \*